US010466740B2

(12) United States Patent
Miller et al.

(10) Patent No.: US 10,466,740 B2
(45) Date of Patent: Nov. 5, 2019

(54) METAL FRAME OF HEAD MOUNT DEVICE HAVING IMPACT ABSORBING WALLS

(71) Applicant: Facebook Technologies, LLC, Menlo Park, CA (US)

(72) Inventors: Robin Michael Miller, Redmond, WA (US); James Aldrich, Castro Valley, CA (US); Julian Hammerstein, Santa Ana, CA (US); Adam Hewko, Kirkland, WA (US); Mark Alan Tempel, Issaquah, WA (US); Joseph Patrick Sullivan, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 191 days.

(21) Appl. No.: 15/610,438

(22) Filed: May 31, 2017

(65) Prior Publication Data

US 2018/0348812 A1 Dec. 6, 2018

(51) Int. Cl.
*G06F 1/16* (2006.01)
*H04N 5/247* (2006.01)
*G06F 1/20* (2006.01)
*H04N 5/225* (2006.01)

(52) U.S. Cl.
CPC ............ *G06F 1/163* (2013.01); *G06F 1/1686* (2013.01); *G06F 1/203* (2013.01); *H04N 5/2257* (2013.01); *H04N 5/247* (2013.01)

(58) Field of Classification Search
CPC ........ G02B 27/0176; G02B 2027/0138; G06F 1/163; G06F 1/1686; G06F 1/203; H04N 5/2257; H04N 5/247

USPC .......................................................... 224/181
See application file for complete search history.

(56) References Cited

U.S. PATENT DOCUMENTS

| 9,980,416 | B2 * | 5/2018 | Reynolds ........... H05K 7/20972 |
| 2012/0069445 | A1 | 3/2012 | Kobayashi |
| 2014/0098009 | A1 | 4/2014 | Prest et al. |
| 2015/0009236 | A1 | 1/2015 | Saito |
| 2015/0253574 | A1 | 9/2015 | Thurber |
| 2015/0268475 | A1 * | 9/2015 | Lee ........................ G06F 1/163 345/8 |
| 2016/0361643 | A1 | 12/2016 | Allin et al. |

(Continued)

FOREIGN PATENT DOCUMENTS

| CN | 106019602 A | 10/2016 |
| CN | 106646871 A | 5/2017 |
| WO | WO 2016/182974 A1 | 11/2016 |

OTHER PUBLICATIONS

Machine Translation of CN 106019602. (Year: 2016).*

(Continued)

*Primary Examiner* — Adam J Waggenspack
(74) *Attorney, Agent, or Firm* — Fenwick & West LLP

(57) ABSTRACT

Embodiments relate to a metal frame in a head-mounted display (HMD) that is structured to absorb impact and protect components of the HMD. The metal frame has a wall that is spaced away from a protection shell securing a display panel in the HMD. When the HMD is dropped or subject to external force, the wall may deform but keep the protection shell intact. Moreover, the metal frame has protruding ridges and brackets that surround outward facing cameras on the HMD. If the HMD is dropped, the protruding ridges and brackets can provide protection to the cameras.

20 Claims, 8 Drawing Sheets

(56) References Cited

U.S. PATENT DOCUMENTS

2017/0102546 A1     4/2017   Tempel et al.
2017/0102549 A1     4/2017   Lee et al.
2017/0153672 A1*   6/2017   Shin .................. G02B 27/0176

OTHER PUBLICATIONS

PCT International Search Report and Written Opinion, PCT Application No. PCT/US2017/052461, dated Jan. 25, 2018, 14 pages.
European Extended Search Report, European Application No. 17204684.9, dated Jul. 6, 2018, 9 pages.

* cited by examiner

METAL FRAME OF HEAD MOUNT DEVICE HAVING IMPACT ABSORBING WALLS

BACKGROUND

The present disclosure relates to a head-mounted display ("HMD"), and specifically, to a metal frame in a HMD.

Head-mounted displays (HMDs) may be used to present augmented and/or virtual information to a user. For example, a virtual reality (VR) headset can be used to simulate virtual environments. HMDs are used in a variety fields, some of these include gaming, engineering, medicine, and aviation. To perform these operations, HMDs can include various internal components as well as sensors such as cameras and inertial measurement units. Such internal components and sensors may be susceptible to damage when dropped or subject to external impact.

SUMMARY

Embodiments relate to a head-mounted display ("HMD"), and specifically, to a metal frame for protecting components of the HMD from impact. The metal frame includes a front surface facing a front cover of the HMD and a rear surface facing a display assembly. The rear surface of the metal frame contains a raised wall that is spaced apart from and extends along an edge of the display assembly to protect the display assembly. When the HMD is dropped or subject to external force, the wall may deform but keep the display assembly intact.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digit of each reference number corresponds to the figure in which the reference number is first used.

Embodiments relate to a metal frame in a head-mounted display (HMD) that is structured to absorb impact and protect components of the HMD. The metal frame has a wall that is spaced away from a protection shell securing a display panel in the HMD. When the HMD is dropped or subject to external force, the wall may deform but keep the protection shell intact. Moreover, the metal frame has protruding ridges and brackets that surround outward facing cameras on the HMD. If the HMD is dropped, the protruding ridges and brackets can provide protection to the cameras.

Figure 1:
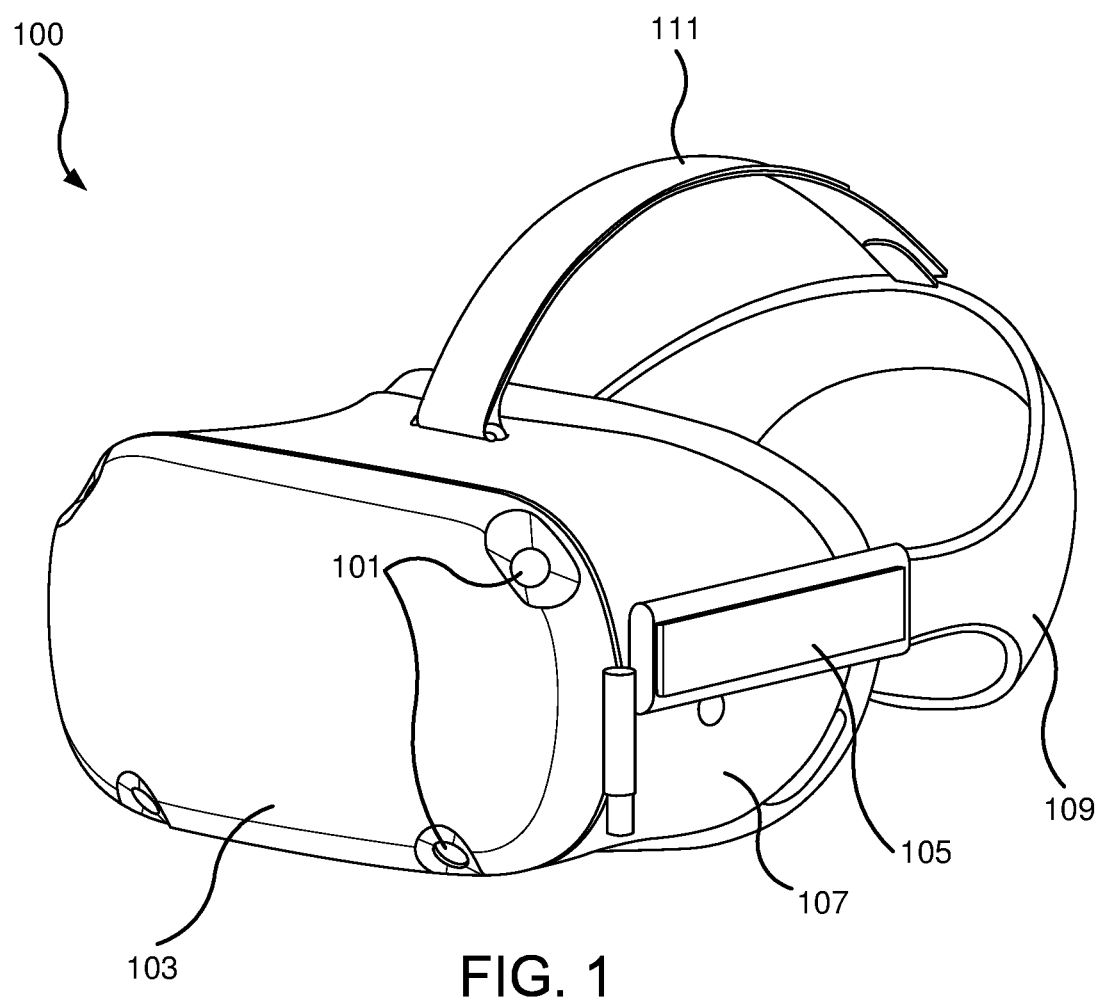
FIG. 1 is a perspective view of a head-mounted display (HMD) according to one embodiment.

FIG. 1 is a perspective view of a HMD 100 according to one embodiment. The HMD 100 may include, among others components, cameras 101, a front cover 103, a head strap connector 105, a side cover 107, and a head strap assembly. The head strap assembly may include a rear strap 109, and an upper strap 111 connected to the rear strap 109. The front cover 103 is attached at the front of the side cover 107. The head strap 109 is attached to the side cover 107 via the head strap connector 105. The upper strap 111 is attached to the head strap 109 and secured by inserting the end of the upper strap 111 into a slot formed in the side body. The front cover 103 covers a front side of the side cover 107. The components and the structure of HMD 100 as illustrated in FIG. 1 are merely illustrative.

The front cover 103 is a rigid member placed at the front part of the HMD 100 to protect components in the HMD 100. In one embodiment, the front cover 103 is secured to the side cover 107 via screws or other fastening mechanism that enables the front cover 103 to be removed from the side cover 107 for maintenance purposes. The front cover has two cameras 101 at upper two corners and bottom two edges. These cameras 101 can be used to capture views outside of the HMD 100, and display them to the user.

The head strap 109 and upper strap 111 wrap around a user's head to fasten the HMD 100 to the user's face. The head strap 109 and the upper strap 111 may be made of elastic, fabric or a combination thereof to be flexible yet comfortable for the user. The head strap 109 is connected to the side cover 107 of the HMD 100 by the head strap connector 105 which can rotate in relation to the side cover 107. Additionally, the head strap connector 105 can disconnect from the side cover 107, enabling a user to replace the head strap 109 or a maintenance technician easier access to the side cover 107. The upper strap 111 provides additional support and is connected to the head strap 109 and the top of the side cover 107.

Figure 2:
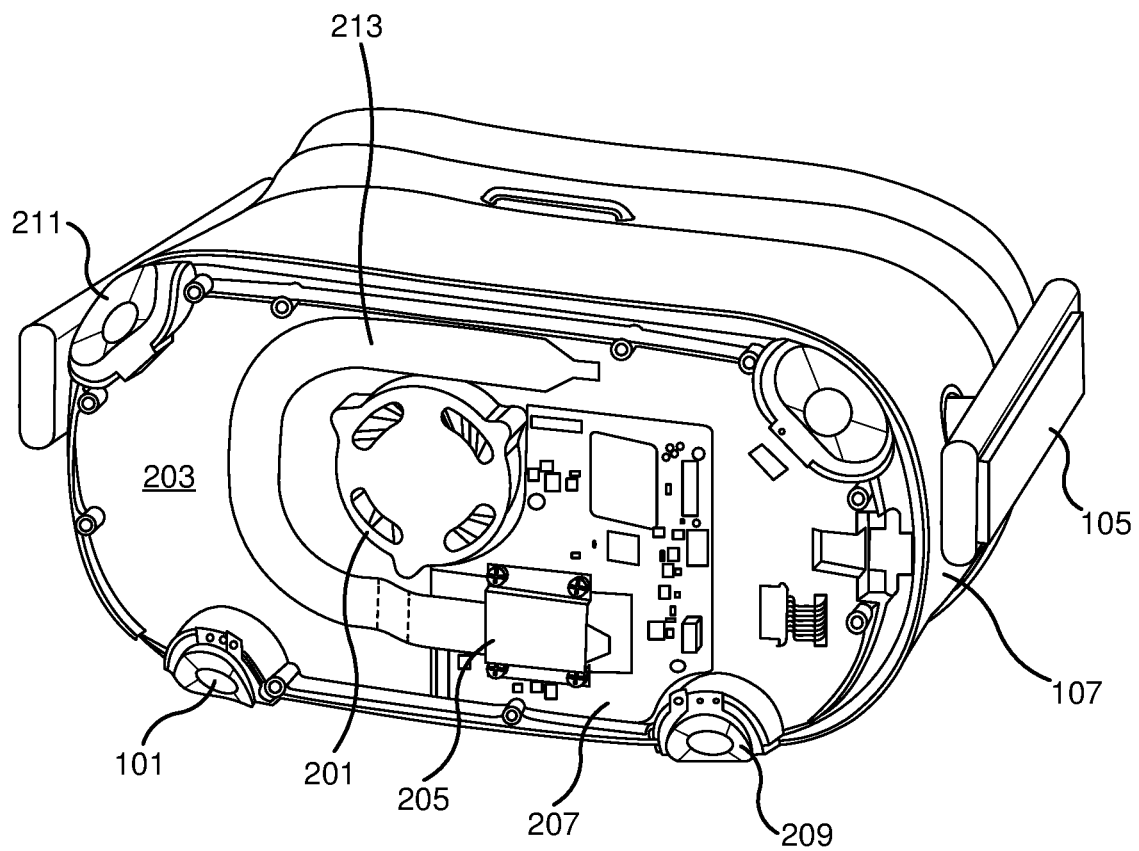
FIG. 2 is a perspective view of the HMD of FIG. 1 with a front cover removed, according to one embodiment.

FIG. 2 is a perspective view of a HMD 100 with the front cover 103, head strap 109, and upper strap 111 removed, according to one embodiment. Behind the font cover 103, a fan 201, printed circuit board (PCB) 207, and heat pipe 213 are mounted to a front surface 203 of a metal frame 309. The HMD 100 also includes, a PCB bracket 205, lower brackets 209, and upper brackets 211. The PCB bracket 205 is mounted to the PCB 207 with an end of the heat pipe 213 placed between the PCB bracket 205 and the PCB 207. The lower brackets 209 and upper brackets 211 are mounted to the upper two corners and bottom two edges of the metal frame 309. The fan 201, heat pipe 213, and PCB 207 may be mounted to the metal frame 309 via screws or adhesive.

The fan 201 and heat pipe 213 dissipates heat generated by the PCB 207. The fan 201 also pulls air from the rear side of the HMD 100 where the user's face is located and thereby cools the user's face by circulating the air. The fan 201 is received in a hole formed in the metal frame 309.

The PCB bracket 205 is connected to the PCB 207 by screws and prevents the heat pipe from disconnecting from the PCB 207 due to thermal expansion, movement of the HMD 100, or application of an external force. The PCB bracket 205 also presses the end of the heat pipe 213 to a processor (not shown) mounted on the PCB 207 so that the heat generated by the processor can be transferred effectively.

The lower brackets 209 and upper brackets 211 surround at least a portion of the cameras 101 and protects the cameras 101 from external impact. For this purpose, the cameras 101 are located in concaved top surfaces of the brackets 209, 211. In this way, any external impact is likely to be applied to the brackets 209, 211 instead of the cameras 101. The brackets 209, 211 may be secured to the front surface 203 by screws that can be removed for easy access to the cameras 101.

The heat pipe 213 has an end connected to the processor of the PCB 207 while other parts are connected to the front surface 203 of the metal frame 309. The heat pipe 213 transfers to heat to the metal frame 309 which functions as a heat sink for absorbing and dissipating the heat.

Figure 3:
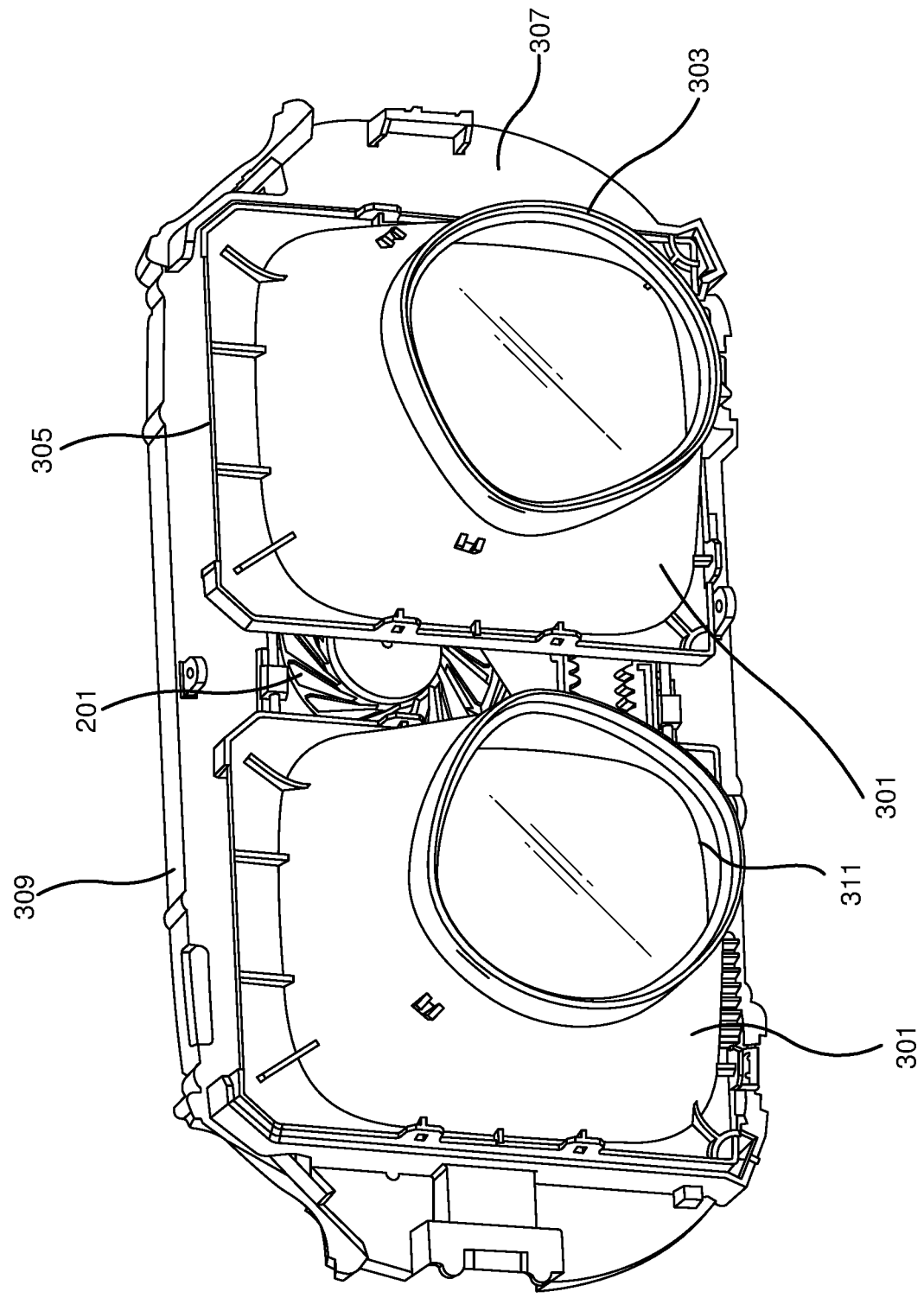
FIG. 3 is a perspective rear view of a metal frame and display protection shells of the HMD of FIG. 1, according to one embodiment.

FIG. 3 is a perspective rear view of the metal frame 309 and two display protection shells 301 of the HMD 100, according to one embodiment. The rear surface 307 of the metal frame 309 is at an opposite side from the front surface 203 seen in FIG. 2. Each display protection shell 301 is mounted to the rear surface 307 of the metal frame 309 with a display panel assembly 311 between the display protection shell 301 and the rear surface 307.

Each display protection shell 301 includes a front end 305 and a rear end 303. The display protection shell 301 also encloses optical elements (not shown) for guiding light from the display panel assembly 311 to the user's eyes. To enclose the optical elements and guide the light to the user's eyes, each of the display protection shells 301 may have a frustum shape.

The metal frame 309 provides structural support to the HMD 100. When the HMD 100 is subject to external impact (e.g., dropping of the HMD 100), the metal frame 309 functions as an internal support that prevents side covers 107 from collapsing. The metal frame 309 also includes walls and pockets to protect the display panel assembly 311 and the display protection shell, as described below in detail with reference to FIGS. 4 and 5. The metal frame 309 also serves as a platform onto which other components of the HMD 100 such as the fan 201 and the PCB 207 can be mounted. The metal frame may have a generally straight upper and lower edges while the right end left edges are generally semicircular. The metal frame 309 also functions as a heat sink that dissipates heat generated by the PCB 207, as described above with reference to FIG. 2.

The display panel assembly 311 displays images to the user. These images can include images of the surrounding environment captured by the cameras 101. These images can also include augmented objects that appear to interact with the surrounding environment.

Figure 4:
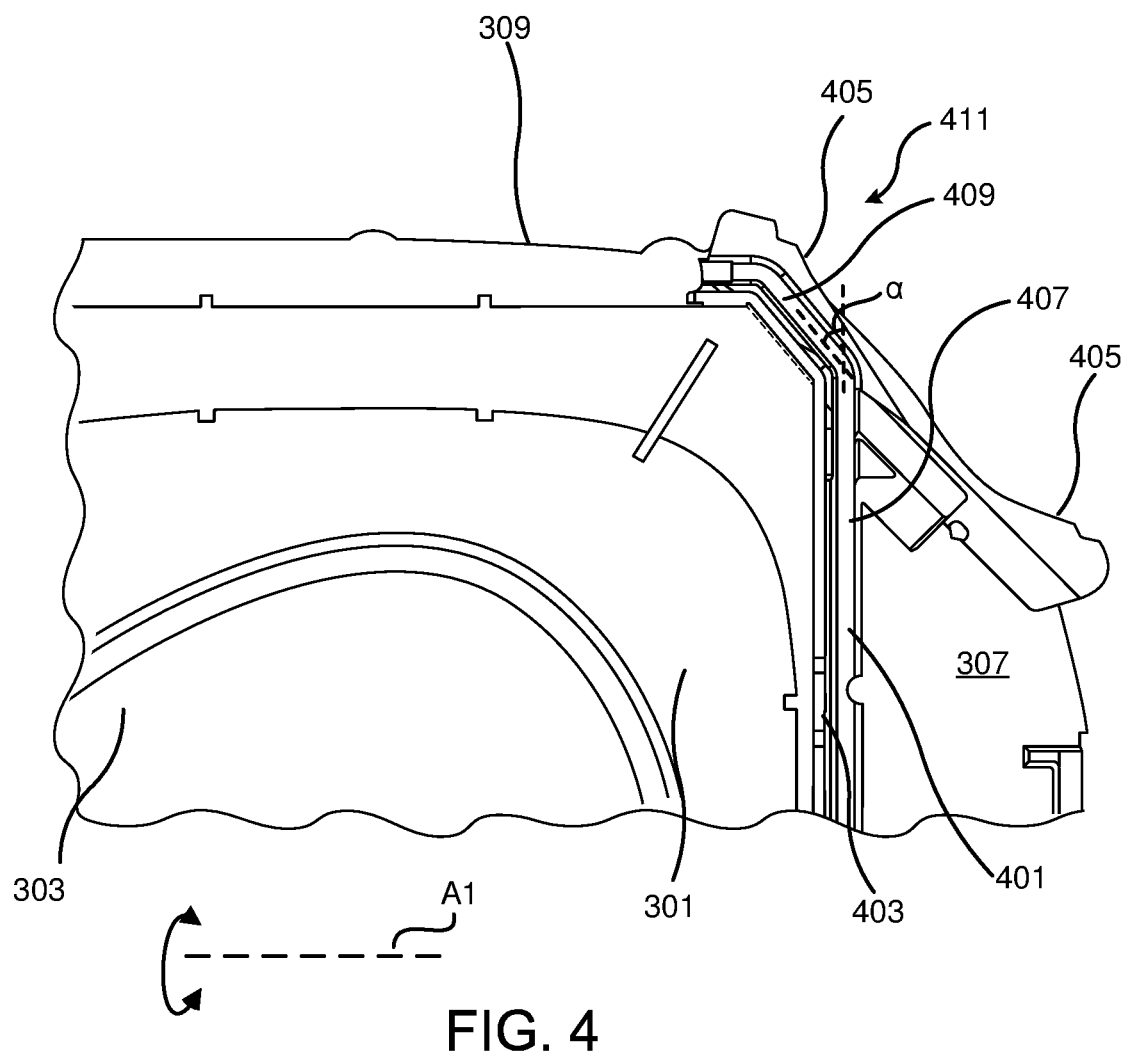
FIG. 4 is an enlarged view of the top rear corner of the metal frame and display assembly of the HMD, according to one embodiment.

FIG. 4 is an enlarged view of the top rear corner of the metal frame 309 and display protection shell 301 of the HMD 100, according to one embodiment. The rear surface 307 has a wall 401 that protrudes rearward and extends parallel to an edge 403 of the display protection shell 301. The upper corner 411 of the metal frame 309 is cut out diagonally and includes a flap 405 for mounting the upper brackets 211.

The wall 401 is spaced apart from the edge 403 of the display protection shell 301. Providing the wall 401 on the metal frame 309 is advantageous, among other reasons, because it absorbs impact and external force, and it increases the rigidity of the metal frame 309. If an external force is applied to the HMD 100 (such as the user dropping it on the ground), the space between the wall 401 of the metal frame 309 and the edge 403 of the display protection shell 301 allows the metal frame 309 to absorb the external force or impact by deforming or bending without damaging the display protection shell 301 or display panel assembly 311. The wall 401 also increases the rigidity of the metal frame 309 against bending about axis A1 because the area of momentum of the metal frame 309 is increased by the presence of the wall 401.

The wall 401 includes a first segment 407 and a second segment 409 that intersects at an angle α. The metal frame 309 has a cut-out section at the upper corners 411, and hence, the wall 401 is bent inward at the upper corners to accommodate the cut-out section. In one embodiment, the second segment 409 extends generally parallel to the cut out surface of the metal frame 309 at the corner 411. The first segment 407 and second segment 409 meet at an angle α to allow the metal frame 309 to be cut at the diagonal direction and include the flap 405 in the upper corner 411 which houses a camera 101. When the impact is applied to the upper corner of the HMD 100 via the upper bracket 211, for example, the second segment 409 absorbs the impact by deforming or bending. The cut-out section may include a hole (not shown) for receiving a screw that secures the upper bracket 211 to the metal frame 309.

In one embodiment, the wall 401 is formed integrally with the other parts of the metal frame 309. In other embodiments, the wall 401 may be formed separately from other parts of the metal frame 309 and be attached to it via adhesive or other securing mechanism.

Figure 5:
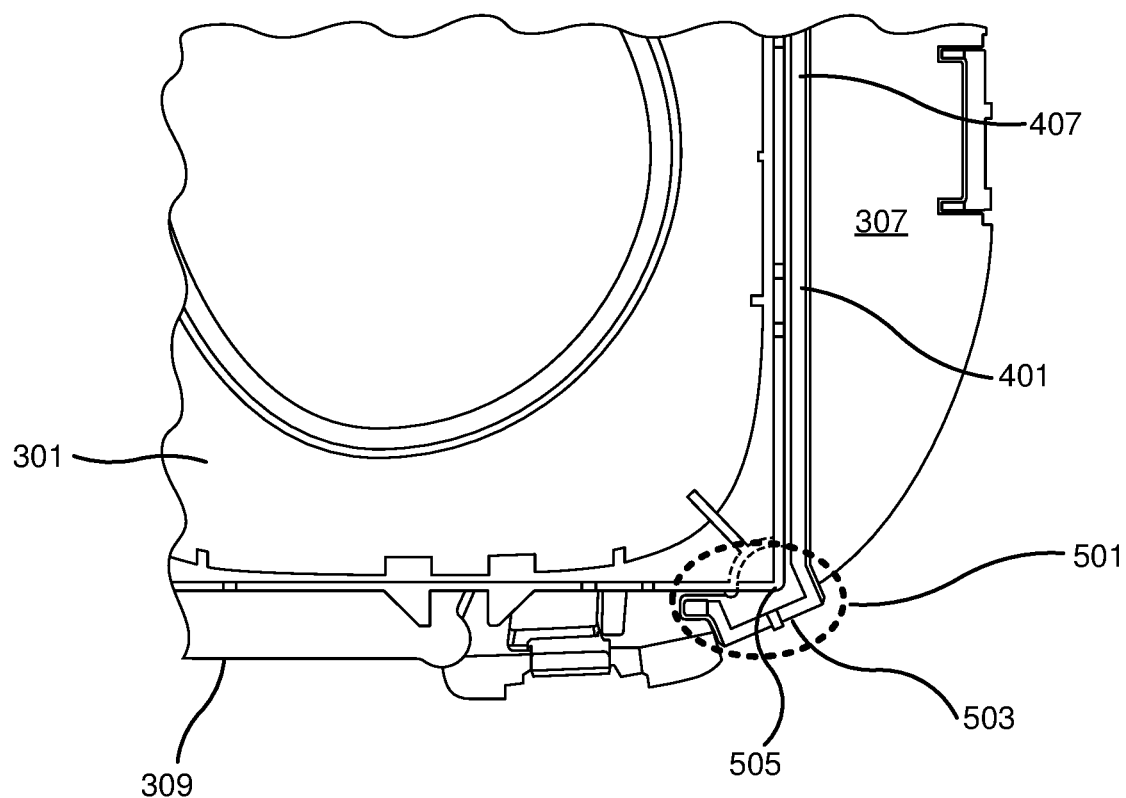
FIG. 5 is an enlarged view of the bottom rear corner of the metal frame and the display assembly of the HMD, according to one embodiment.

FIG. 5 is an enlarged view of the bottom rear corner of the metal frame 309 and the display protection shell 301 of the HMD 100, according to one embodiment. As illustrated in FIG. 5, in addition to the first segment 407 and second segment 409, the wall 401 may further include a third segment 503 which forms a pocket 501 to receive a corner 505 of the display protection shell 301 and/or a corner of the display panel assembly 311.

The pocket 501 formed by the third segment 503 of the wall 401 allows further protection against external force or impact upon the HMD 100 by allowing the metal frame to deform or bend without damaging or displacing the display protection shell 301 and/or the display panel assembly 311.

Figure 6:
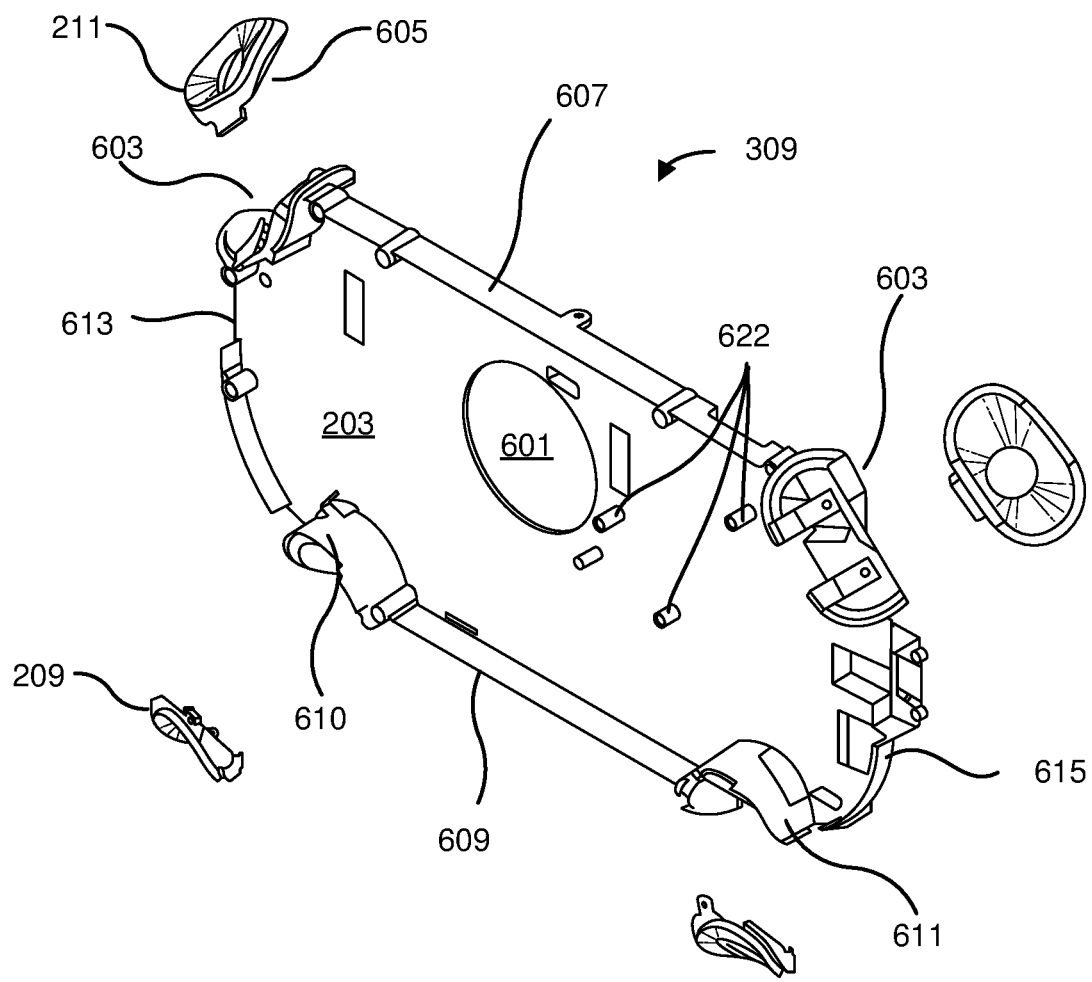
FIG. 6 is an exploded perspective view of the metal frame of the HMD, according to one embodiment.

FIG. 6 is an exploded perspective view of the metal frame 309 of the HMD 100, according to one embodiment. As seen in FIG. 6, the metal frame 309 may include, among other features, an opening 601, diagonal cut-out parts 603, a top edge 607, a bottom edge 609, bosses 622, and semi-circular side walls 613, 615. Semi-cylindrical walls 610 611 are provided at the bottom edge 609.

The opening 601 in the metal frame 309 is dimensioned to receive the fan 201, as described above with reference to FIG. 2.

As previously discussed, bracket 211 and bracket 209 are attached to the metal frame 309 to secure cameras 101. Specifically, bracket 211 is attached to a diagonal cut-out part 603 comprising a flap 405 having a top contour that matches a bottom contour 605 of bracket 211. Additionally, each of the bottom brackets 209 is attached to a semi-cylindrical wall 610, 611 at the bottom edge 609 of the metal frame 309.

The bosses 622 are provided on the front surfaces of the metal frame 309 to receive screws for fixing components such as the PCB 207 onto the metal frame 309.

Figure 7:
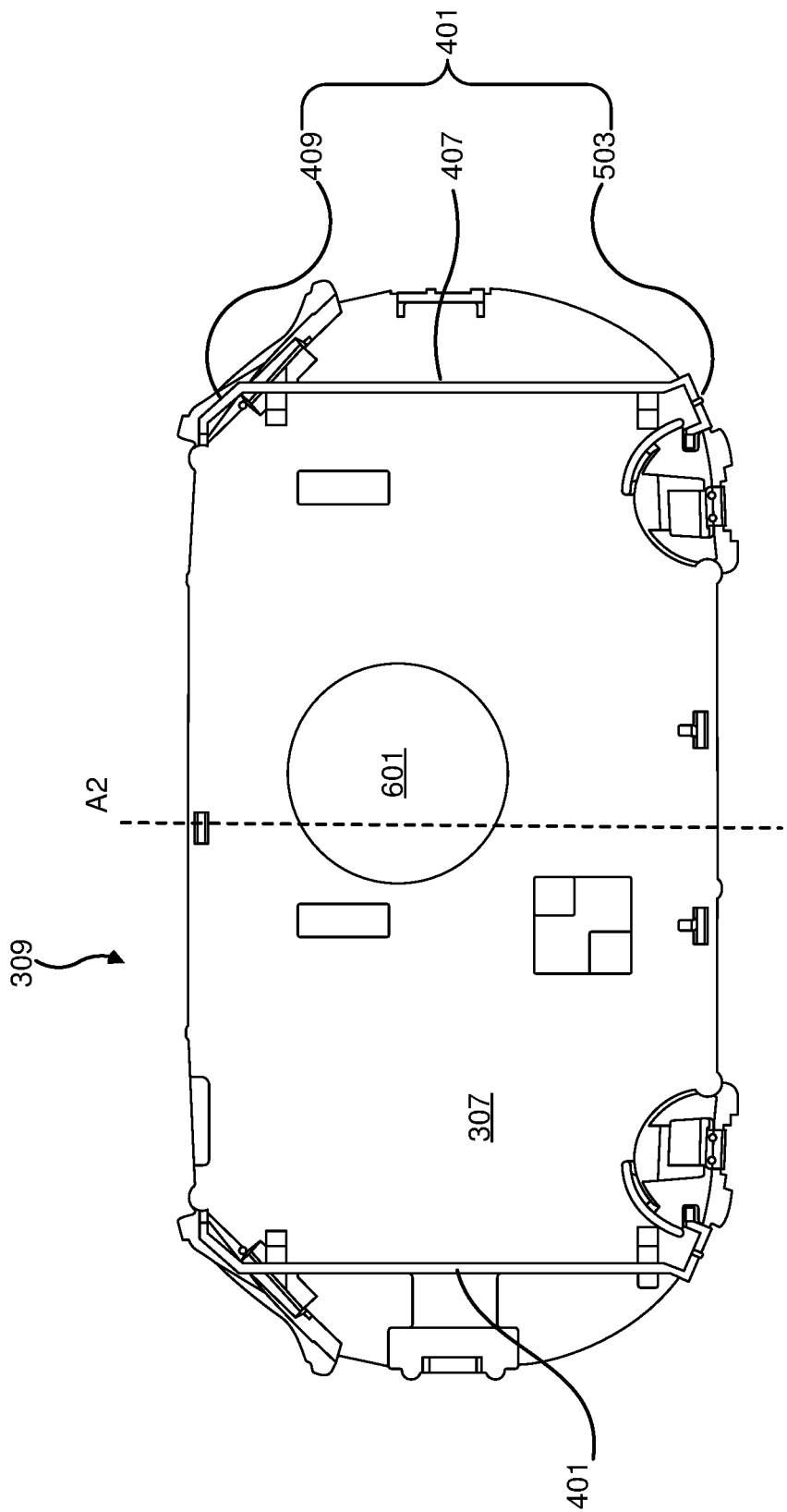
FIG. 7 is a rear view of the metal frame of the HMD according to one embodiment.

FIG. 7 is a rear view of the metal frame 309 of the HMD 100 according to one embodiment. As illustrated in FIG. 7, the walls 401 are provided at the left side as well as the right side of the HMD 100. The metal frame 309 also has a generally a symmetric shape across axis A2.

Figure 8:
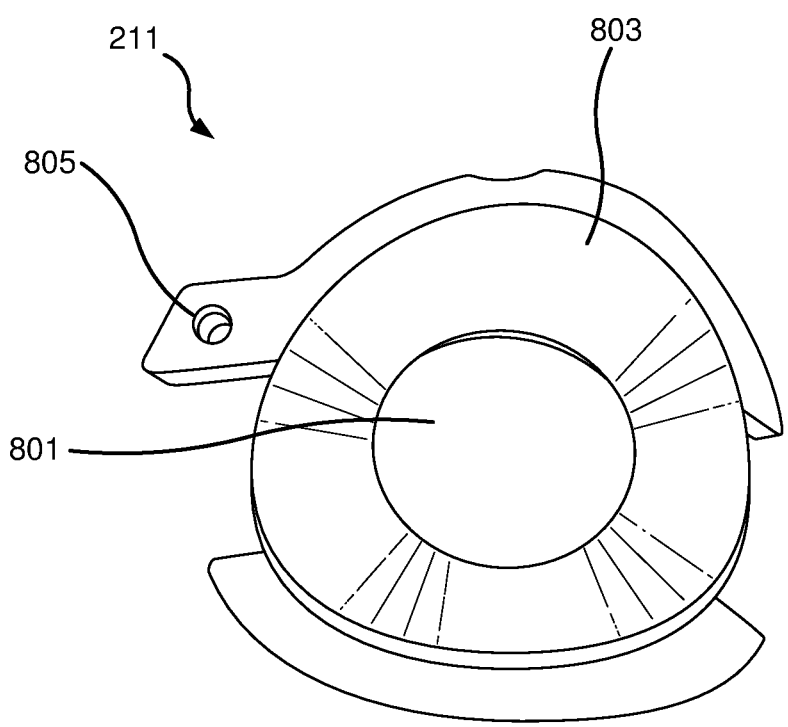
FIG. 8 is a perspective diagram of a bracket for protecting a camera, according to one embodiment.

FIG. 8 is a perspective diagram of the upper bracket 211 for protecting a camera 101, according to one embodiment. The upper bracket 211 may include, among other features, a washer plate 803 formed with a circular hole 801 and a screw hole 805.

The camera 101 will be housed within the circular hole 801 and constrained by the washer plate 803 of the bracket. The washer plate 803 has a profile that matches with the upper profile of the cut-out section, including the flaps 405. The screw hole 805 allows the passage of a screw to secure the bracket 209 to the metal frame 309.

The lower bracket 209 has a similar structure as the upper bracket 211, and the detailed description thereof is omitted herein for the sake of brevity.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

The invention claimed is:

1. A display, comprising:
a display panel assembly configured to display images;
a display protection shell having a front end configured to attach to the display panel assembly; and
a metal frame comprising:
a front surface,
a rear surface at an opposite side of the front surface, the display panel assembly placed between the front end of the display protection shell and the rear surface, and
a wall raised from the rear surface, the wall spaced apart from and extending along at least an edge of the display protection shell to protect the display protection shell, the wall including:
a first segment extending along the edge of the display protection shell,
a second segment angled outward from the edge, and
a third segment angled inward toward the edge, the third segment in conjunction with the second segment forming a pocket that receives a corner of the display protection shell.

2. The display of claim 1, wherein the first segment of the wall is spaced apart from and extends between at least one corner to another corner of the display protection shell.

3. The display of claim 1, wherein at least one corner of the display protection shell is cut out in a diagonal direction, and wherein the first segment of the wall extends straight along the edge of the display protection shell and a fourth segment, connected to the first segment, is curved relative to the first segment at an angle.

4. The display of claim 1, wherein the corner of the display protection shell has perpendicular edges.

5. The display of claim 1, further comprising a bracket attached to a cut-out part at a corner of the metal frame, the bracket configured to surround at least a portion of a camera.

6. The display of claim 5, wherein the cut-out part of the metal frame has a flap having a top contour that matches a bottom contour of the bracket.

7. The display of claim 5, wherein the bracket has a circular hole at a center through which the camera captures views.

8. The display of claim 5, further comprising another bracket attached to an edge of the metal frame, the other bracket configured to surround at least a portion of another camera.

9. The display of claim 8, wherein the metal frame comprises a semi-cylindrical wall at the edge to receive the other camera between the semi-cylindrical wall and the other bracket.

10. The display of claim 1, wherein the metal frame has an opening for receiving a cooling fan.

11. The display of claim 1, wherein the metal frame is made of magnesium.

12. The display of claim 1, wherein a portion of the display protection shell has a frustum shape.

13. A metal frame in a head-mounted display, comprising:
a front surface,
a rear surface at an opposite side of the front surface, a display panel assembly placed between a front end of a display protection shell and the rear surface, and
a wall raised from the rear surface, the wall spaced apart from and configured to extend along at least an edge of the display protection shell to protect the display protection shell, the wall including:
a first segment extending along the edge of the display protection shell,
a second segment angled outward from the edge, and
a third segment angled inward toward the edge, the third segment in conjunction with the second segment forming a pocket that receives a corner of the display protection shell.

14. The metal frame of claim 13, wherein the first segment of the wall is spaced apart from and extends between at least one corner to another corner of the di splay protection shell.

15. The metal frame of claim 13, wherein at least one corner of the display protection shell is cut out in a diagonal direction, and wherein the first segment of the wall extends straight along a side edge of the display protection shell and a fourth segment, connected to the first segment, is curved relative to the first segment at an angle.

16. The metal frame of claim 1, wherein the corner of the display protection shell has perpendicular edges.

17. The metal frame of claim 13, wherein the metal frame further comprises a flap having a top contour that matches a bottom contour of a bracket that protects a camera.

18. The metal frame of claim 17, wherein the metal frame further comprises a semi-cylindrical wall at an edge to receive another camera between the semi-cylindrical wall and another bracket.

19. The metal frame of claim 13, wherein the metal frame has an opening for receiving a cooling fan.

20. The metal frame of claim 13, wherein the metal frame is made of magnesium.

\* \* \* \* \*

UNITED STATES PATENT AND TRADEMARK OFFICE
CERTIFICATE OF CORRECTION

PATENT NO. : 10,466,740 B2  
APPLICATION NO. : 15/610438  
DATED : November 5, 2019  
INVENTOR(S) : Robin Michael Miller et al.

Page 1 of 1

It is certified that error appears in the above-identified patent and that said Letters Patent is hereby corrected as shown below:

In the Claims

Column 5, Line 25, Claim 1, delete "A display, comprising:" and insert -- A display comprising: --.

Column 6, Line 46, Claim 16, delete "The metal frame of claim" and insert -- The display of claim --.

Signed and Sealed this  
Eighth Day of September, 2020

Andrei Iancu  
*Director of the United States Patent and Trademark Office*